United States Patent [19]

Delguercio

[11] Patent Number: 5,528,522
[45] Date of Patent: Jun. 18, 1996

[54] PORTABLE RADAR OR BEACON EMULATOR

[75] Inventor: Vincent J. Delguercio, Elm, N.J.

[73] Assignee: United States of America, Washington, D.C.

[21] Appl. No.: 318,483

[22] Filed: Oct. 5, 1994

Related U.S. Application Data

[63] Continuation of Ser. No. 968,957, Oct. 30, 1992, abandoned.

[51] Int. Cl.⁶ .................................................. G06F 17/00
[52] U.S. Cl. ........................... 364/578; 364/516; 395/500
[58] Field of Search .................................... 364/578, 516; 395/920, 112, 500

[56] References Cited

U.S. PATENT DOCUMENTS

| | | | |
|---|---|---|---|
| 3,927,405 | 12/1975 | Poinsard et al. | 364/516 |
| 4,266,292 | 5/1981 | Reagan et al. | 370/13 |
| 4,338,843 | 7/1982 | Wise | 84/1.01 |
| 4,393,456 | 7/1983 | Marshal, Jr. | 370/50 |
| 4,409,661 | 10/1983 | Romanski | 364/516 |
| 4,549,265 | 10/1985 | Deckers et al. | 364/413.21 |
| 4,633,398 | 12/1986 | Gullberg | 364/413.21 |
| 4,750,137 | 6/1988 | Harper et al. | 364/514 |
| 4,837,679 | 6/1989 | Wiles, Jr. et al. | 395/250 |
| 5,046,025 | 9/1991 | Harper et al. | 364/514 |

*Primary Examiner*—Ellis B. Ramirez
*Assistant Examiner*—Thomas Peeso
*Attorney, Agent, or Firm*—Otto M. Wildensteiner

[57] ABSTRACT

An emulator for a radar set which utilizes a conventional personal computer rather than specialized equipment. The emulator comprises a printed circuit board and a program for operation of the computer. The computer calculates the data for one antenna scan and stores it in a memory bank on the board; as this is being read out as radar video which is displayed on the screen, the computer calculates the data for the next scan and stores it in a second memory bank on the board. In this way a continuous series of scans is presented without requiring the extensive computational power that would be required to display a scan as it is being calculated.

11 Claims, 11 Drawing Sheets

-- CONFIGURATION FILE
-- BEACON ONLY MODE
-- defaults.cfg

1. Memory base address : 8
2. I/O port base address : 300
3. Scan time : 3.94
4. Primary radar PRF : 1141
5. Beacon max range : 55.00
6. Countdown (radar to beacon) : 3
7. Ratio 3A to C : 2
8. Delay primary after beacon : 13.00
9. Delay P3 after beacon : 73.00
10. Delay T0 after beacon : 102.00
11. Video pulse width : 300
12. Video skew : 50

Fig. 3

-- PROBE AIRCRAFT SCENARIO FILE
-- FOR SYSTEM TESTING   1-17-91

-- TAG TIME BCN RANGE AZIMUTH SPEED ACCEL ALT CLIMB HDG TURN REP MC

| TAG | TIME | BCN | RANGE | AZIMUTH | SPEED | ACCEL | ALT | CLIMB | HDG | TURN | REP | MC |
|---|---|---|---|---|---|---|---|---|---|---|---|---|
| 0001 | 00:00:05 | 1234 | 40.0 | 010.0 | 000.0 | 00.0 | 10000 | 0.0 | 90.0 | 0.0 | 34 | T |
| 0002 | 00:00:01 | 1200 | 30.0 | 210.0 | 000.0 | 00.0 | 00500 | 0.0 | 00.0 | 3.0 | 14 | F |
| 0003 | 00:00:01 | 7777 | 20.0 | 320.0 | 290.0 | 00.0 | 19000 | 2.0 | 90.0 | 0.0 | 24 | T |
| 0074 | 00:00:01 | 0000 | 50.0 | 130.0 | 390.0 | 00.0 | 30000 | 3.0 | 345.0 | -4.0 | 44 | T |
| 0005 | 00:00:01 | 5555 | 15.0 | 340.0 | 000.0 | 00.0 | 05000 | 0.0 | 180.0 | 7.0 | 14 | F |
| 0005 | 00:00:20 | XXX | XX | XXX | 100.0 | 00.0 | XXXX | 0.0 | XXX | 0.0 | 24 | T |
| 0111 | 00:00:01 | 4321 | 40.0 | 250.0 | 090.0 | 00.0 | 40000 | 1.0 | 290.0 | 1.0 | 18 | T |
| 9999 | 00:00:01 | 3062 | 6.75 | 190.0 | 190.0 | 00.0 | 15000 | 0.0 | 190.0 | 0.0 | 22 | F |
| 0002 | 00:00:40 | 1200 | 30.0 | 210.0 | 000.0 | 00.0 | 00500 | 0.0 | 00.0 | 3.0 | 14 | F |
| 0003 | 00:00:40 | 7777 | 20.0 | 320.0 | 290.0 | 00.0 | 19000 | 2.0 | 90.0 | 0.0 | 24 | T |
| 0040 | 00:00:40 | 0000 | 50.0 | 130.0 | 390.0 | 00.0 | 30000 | 3.0 | 345.0 | -4.0 | 44 | T |
| 0050 | 00:00:40 | 5555 | 05.0 | 340.0 | 490.0 | 00.0 | 05000 | 0.0 | 180.0 | 7.0 | 14 | F |
| 0060 | 00:00:40 | XXX | XX | XXX | XXX | 00.0 | XXXX | 0.0 | XXX | 0.0 | 24 | T |
| 0070 | 00:00:40 | 4321 | 40.0 | 250.0 | 090.0 | 00.0 | 40000 | -1.0 | 290.0 | 1.0 | 18 | T |
| 0070 | 00:15:59 | 4321 | 40.0 | 250.0 | 090.0 | 00.0 | 40000 | -1.0 | 290.0 | 1.0 | 18 | T |

Fig. 4

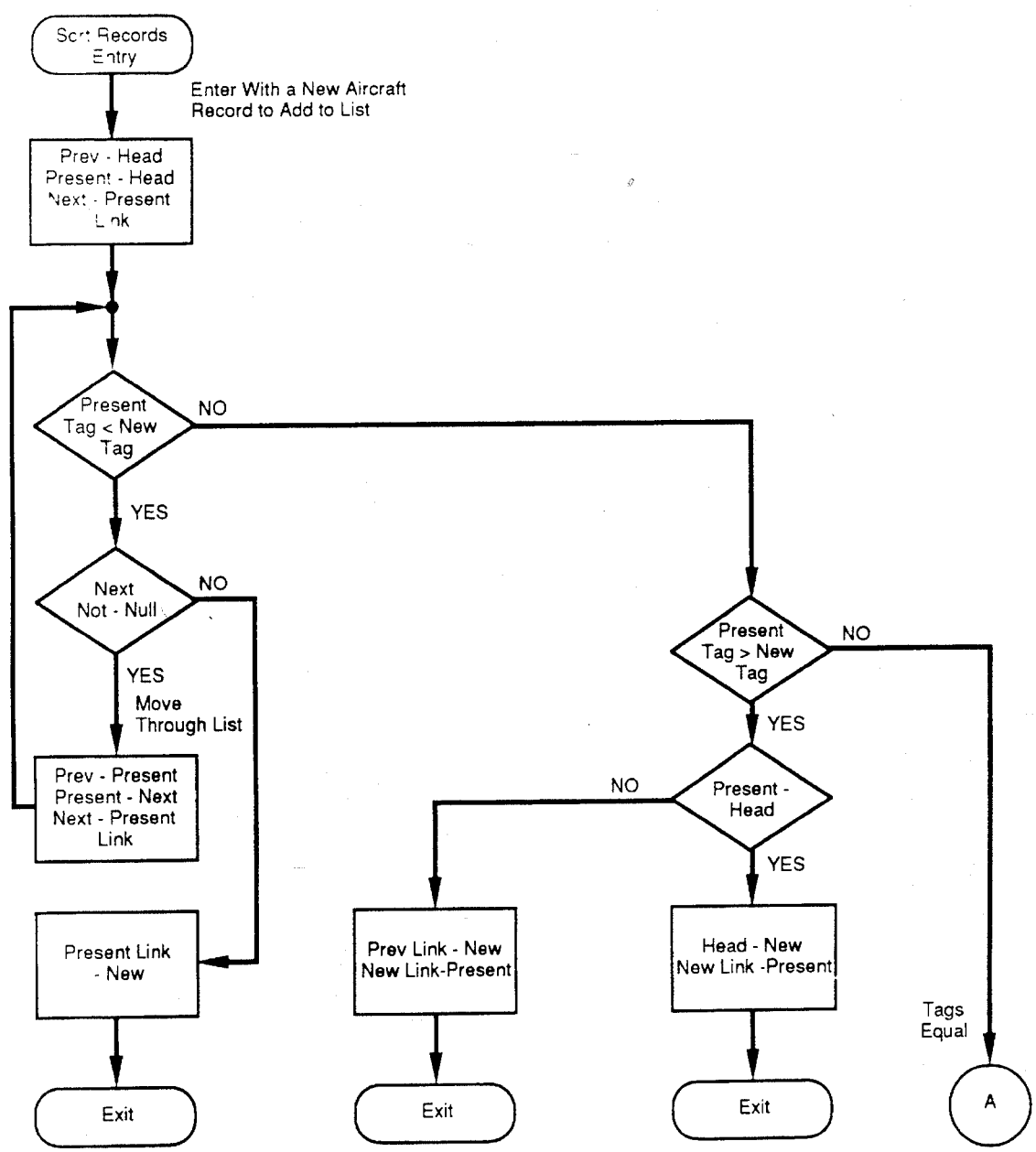
Figure 5-a.

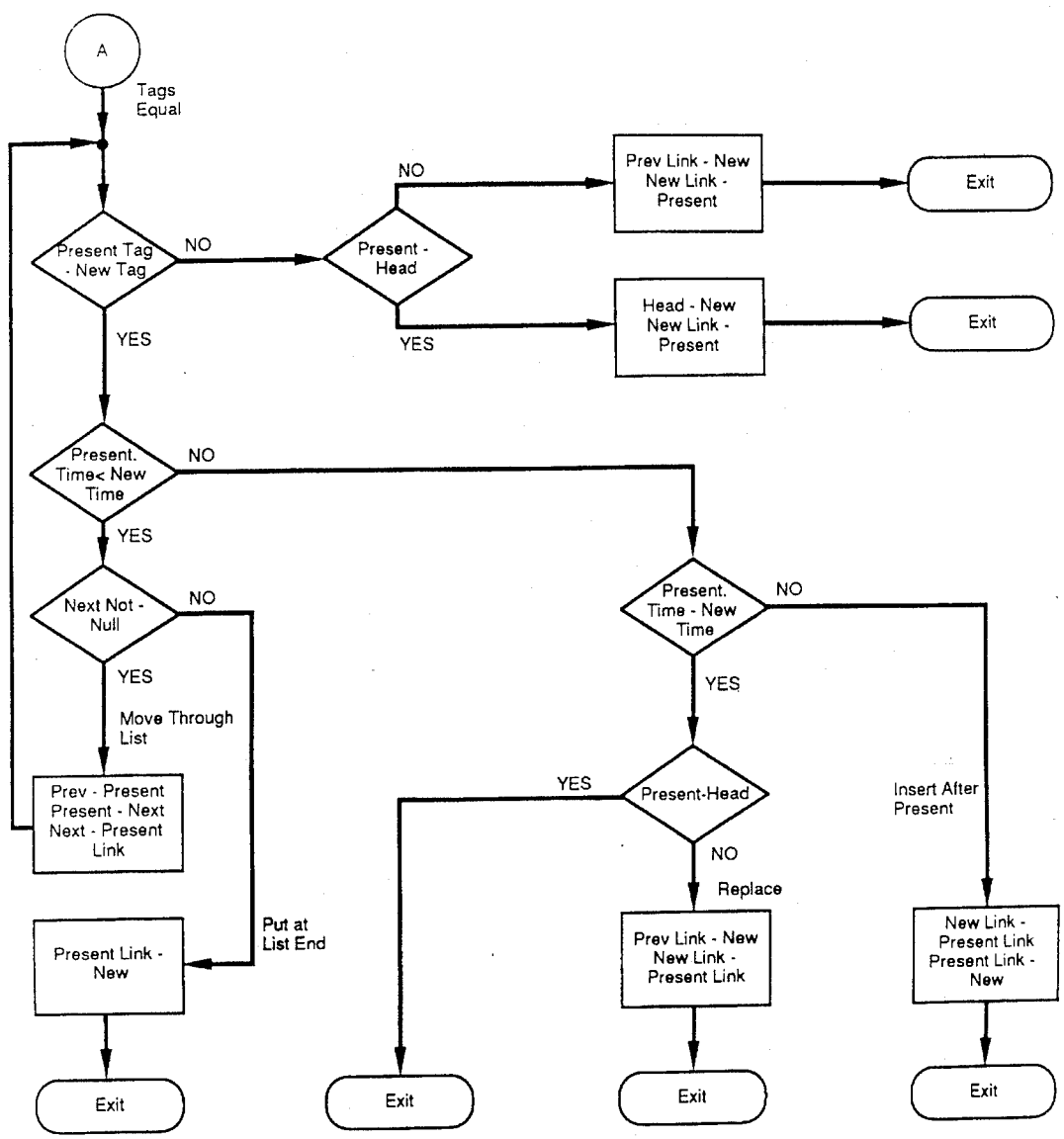
Figure 5-b.

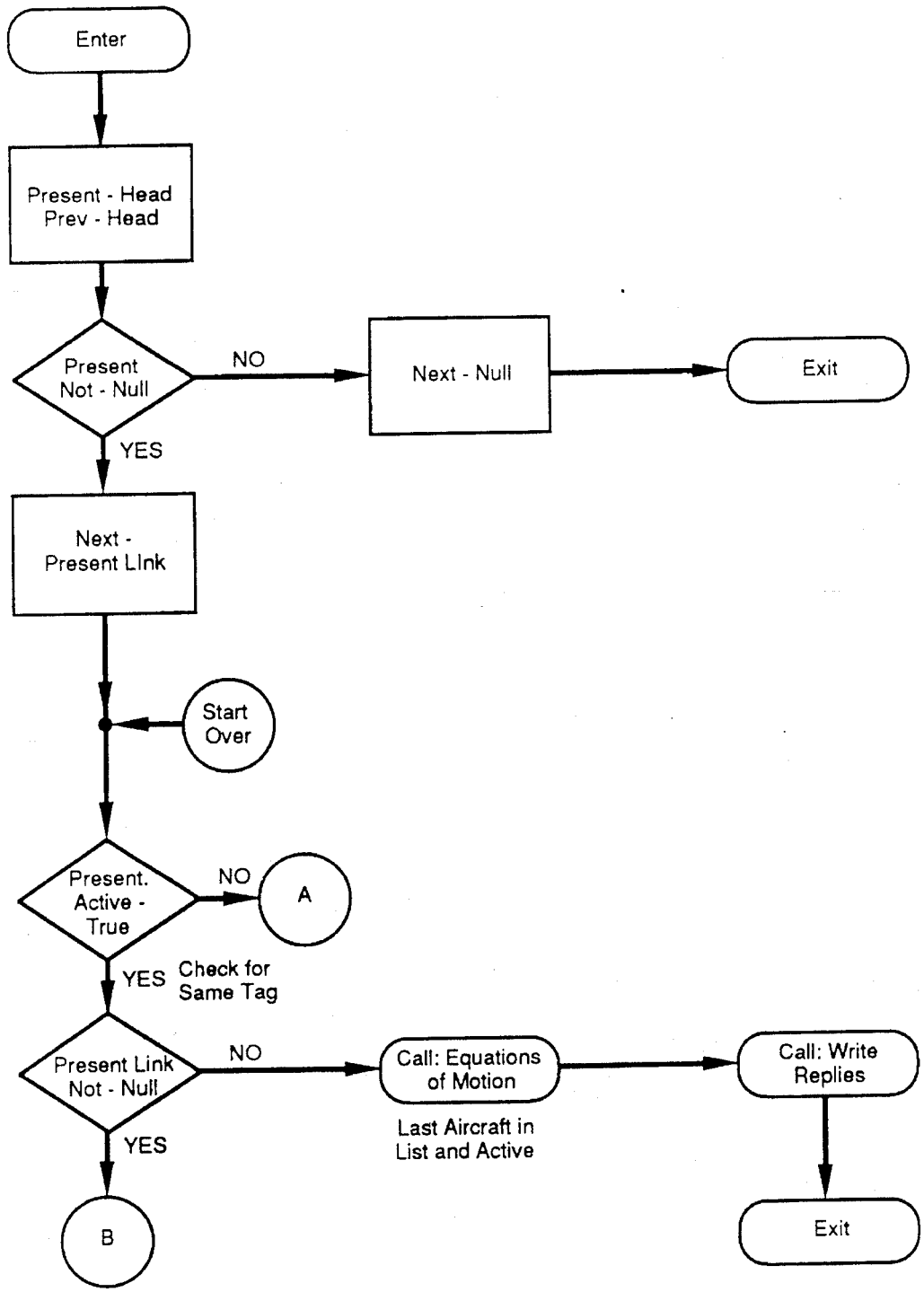
Figure 6-a.

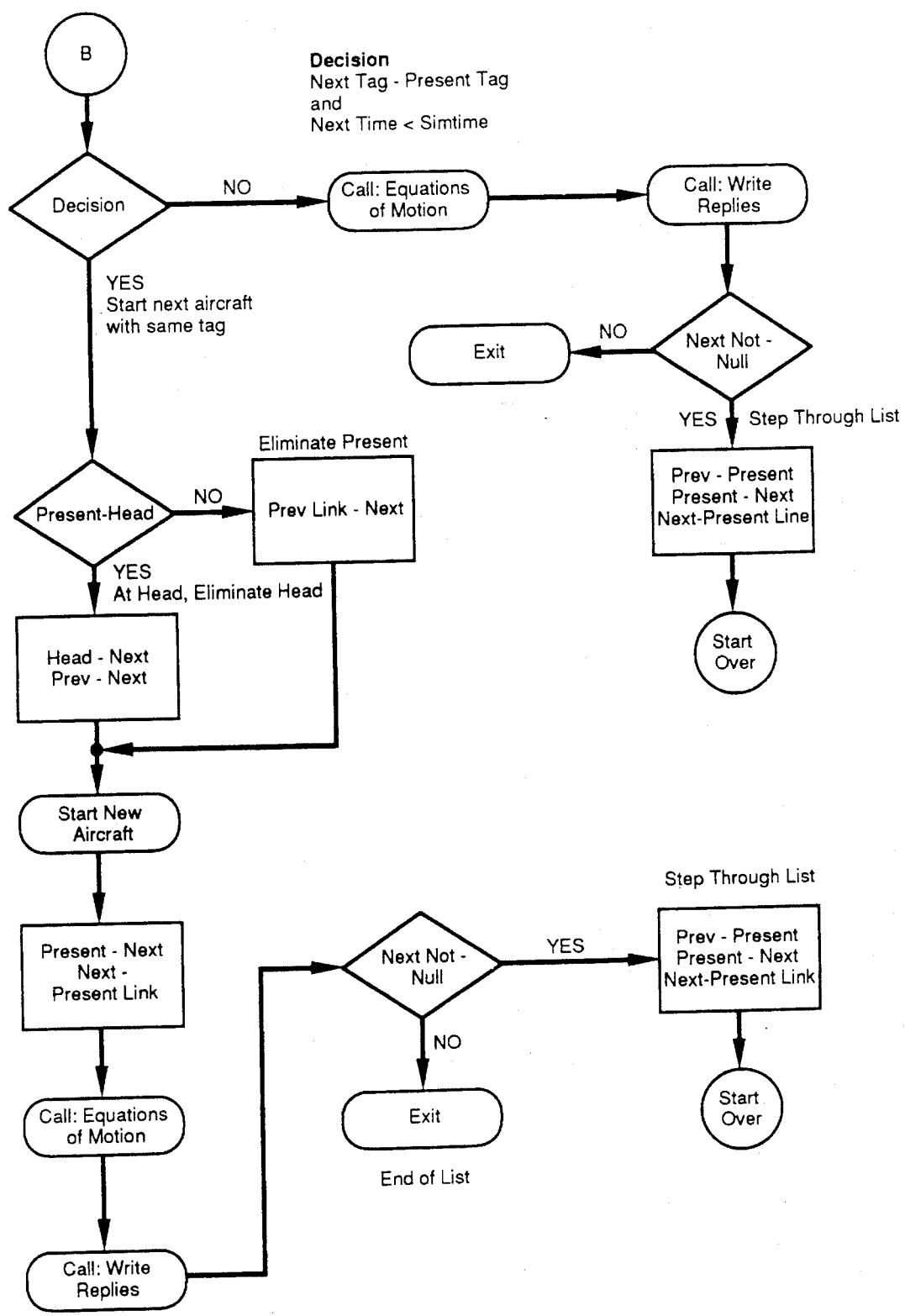
Figure 6-b.

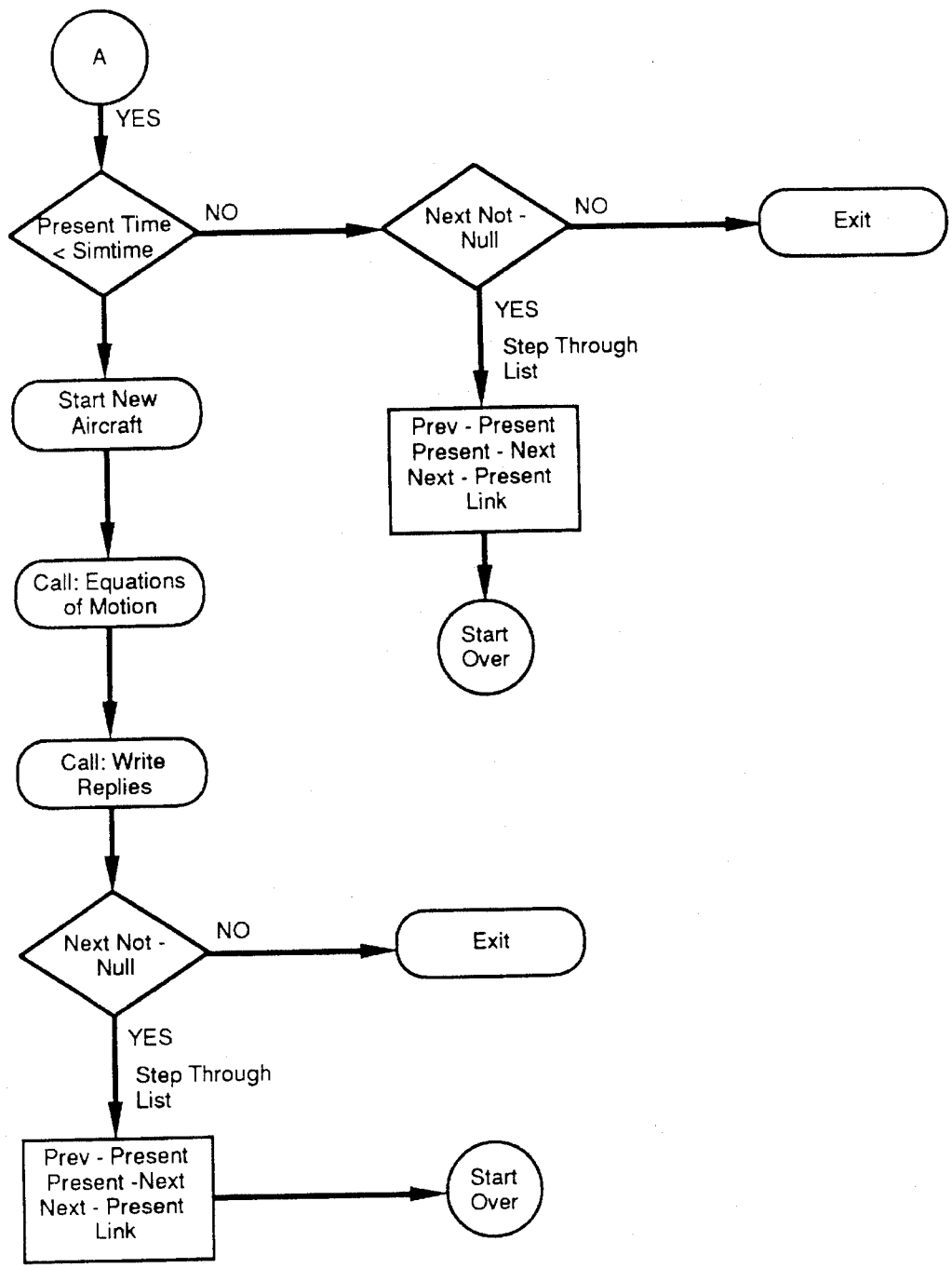
Figure 6-c.

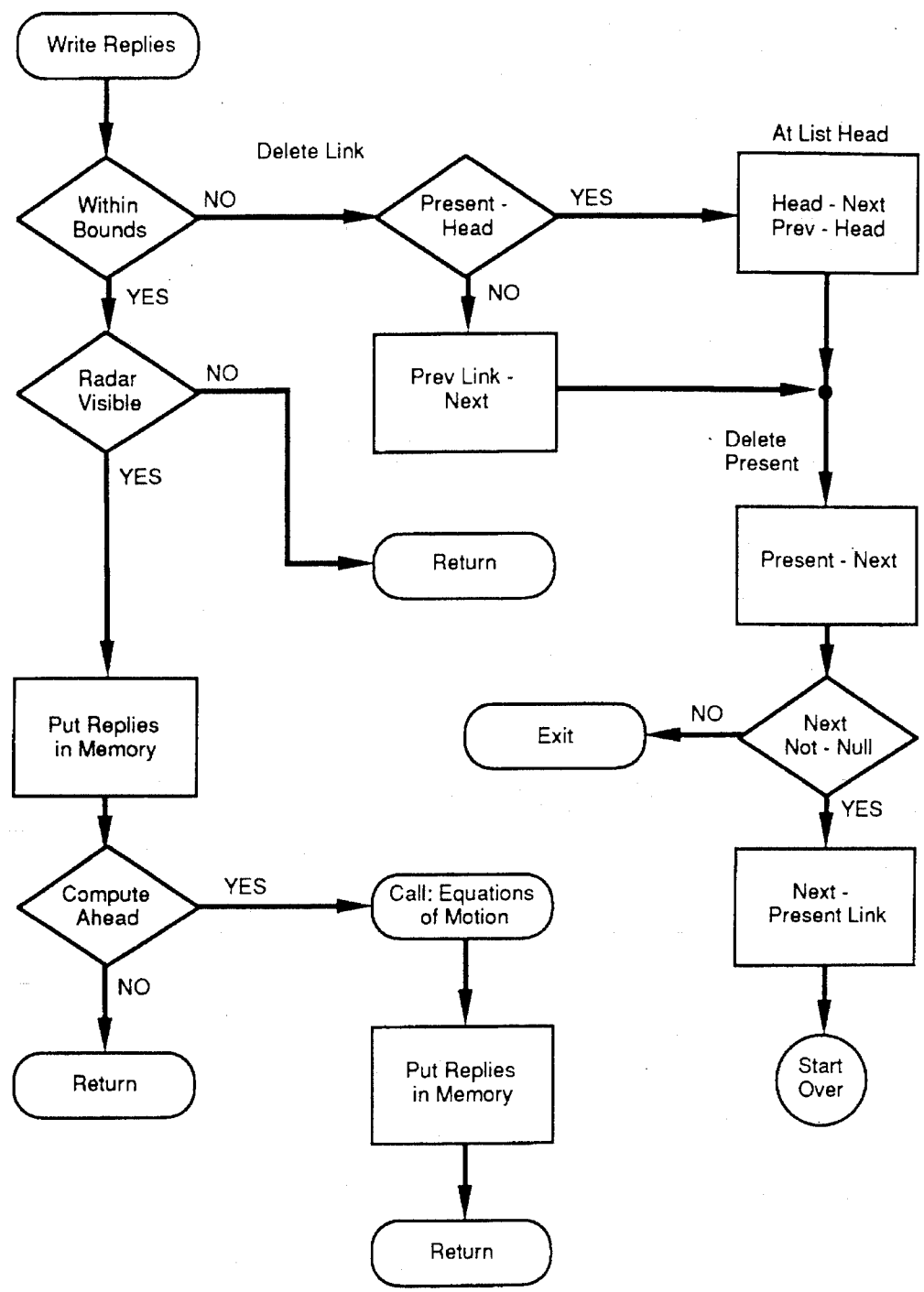
Figure 6-d

PORTABLE RADAR OR BEACON EMULATOR

STATEMENT OF GOVERNMENT INTEREST

The present invention may be made or used by or on behalf of the Government of the United States for governmental purposes without the payment of any royalties thereon or therefor.

This is a continuation of application Ser. No. 07/968,957 filed on Oct. 30, 1992, now abandoned.

BACKGROUND OF THE INVENTION

The present invention relates to radar system simulations and more particularly relates to emulating the analog video signals and control signals produced by a search or beacon radar system.

The radar systems which can be emulated by the present invention are divided into two broad types: search radars and beacon radars. The following paragraphs are based on the type of radar systems which are employed in the civilian air traffic control environment. The terms defined are the common terms used in that environment.

For both radar types, rotating antennas are used and generally both radar antennas are mounted on the same rotating structure and aligned in the same direction. As the antennas rotate they periodically transmit electromagnetic pulses; these transmissions are known as radar sweeps. The rate of transmission is called the Pulse Repetition Frequency (PRF). Search and beacon radars can have different PRFs; however, they are synchronized to transmit at a known time difference when both radars are to transmit in the same sweep.

The analog output information from a radar system is referred to as radar video. The azimuth at which the antennas are pointing is provided to external equipment by the use of two signal lines. A north reference signal called the Azimuth Reference Pulse (ARP) is used to indicate when the radar is pointing north. One full rotation of the radar is divided into 4.096 Azimuth Change Pulses (ACPs). These pulses are transmitted serially during the antenna rotation to indicate azimuth. A complete antenna rotation is called an antenna scan, and begins with an Azimuth Reference Pulse (ARP) and ends just before the next ARP.

A search radar system is conceptually simple. As the antenna rotates through a complete scan it generates many sweeps. At the begining of each sweep an electromagnetic pulse of high energy and short duration is transmitted. A receiver detects the reflected electromagnetic energy (i.e. the radar return) and presents it to other equipment for processing or display. The time difference between transmission and return is used to determine the range of a target. The target azimuth is defined by the ARP and ACP signals.

A beacon radar system requires active participation by the target to enable the target to be detected. In this case an encoded set of pulses, called mode pairs, is transmitted by the beacon antenna. The transmission of these pulses is called an interrogation. A properly equipped aircraft has a device called a transponder which detects the pulse pair as valid and replies with response pulses. The response pulses contain either altitude information or an assigned aircraft identification number. The range and azimuth of the aircraft are determined in a manner similar to that used for search radar. The beacon radar transmits mode pair pulses separated by twenty-one microseconds to request altitude information. This is known as a Mode C interrogation. Similarly, the beacon radar transmits mode pair pulses separated by eight microseconds to request the aircraft identification number. This is known as a Mode 3/A interrogation. In each case the response from an aircraft is a serial bit train of 15 pulses, each pulse separated by 1.45 microseconds. The first and fifteenth pulses are always present and are called framing pulses. The inner thirteen pulses are data bits which carry the requested information, i.e. Mode C or Mode 3/A data. Occasionally an additional bit can be appended 4.35 microseconds after the last framing pulse. This bit is called the special position identifier bit and can be used to highlight a particular aircraft. Other interrogation modes exist but these modes are not normally used in civilian aviation.

Radar simulation systems have been proposed in which a list of aircraft are simulated in a digital computer and the proper response for each aircraft is presented by the computer to a hardware interface for output on a sweep to sweep basis. This type of system requires close coordination between the output hardware and the digital computer, which in turn requires a significant amount of complex high-speed hardware to present each aircraft's position at the proper time. Also, the requirement on the computer to service the output hardware each sweep presents a significant burden on the processing time of the computer. Another drawback of the prior art is that the aircraft must be processed in an azimuth arranged fashion. This requires that if any simulation of dynamic targets is attempted, sorting of aircraft must be continuously conducted to ensure the proper output sequencing. Most of the prior art is based on only the simulation of search radars.

SUMMARY OF THE INVENTION

Briefly, the present invention (Portable Radar Or Beacon Emulator, or PROBE) introduces a new technique for the emulation of radar systems to be used in testing radar sets, which is based on the use of a properly programmed conventional personal computer and a specialized hardware interface card. A typical application for the present invention would be to create specific aircraft flight scenarios which can be used to test systems and procedures used by air traffic controllers. Because the present invention can generate thousands of targets it is also useful for capacity testing of air traffic control systems.

Initial parameters such as position, altitude, velocity, and heading are input by the user via a formatted text file. Likewise, any desired course changes, etc. are also input by the user with a time dependent selection in the text file. The computer then calculates the initial positions of all of the aircraft based on these initial parameters for a first scan of the radar antenna, and stores the data in a first memory bank as a serial bit train or data stream. This serial data stream is referred to as radar video, and is identical to what is generated in an operating radar set. At the end of the scan the program detects the Azimuth Reference Pulse (ARP). When this occurs the memory banks are switched so that the hardware can send the contents of the first memory bank to the equipment being tested. The data which is sent appears to the receiving equipment to be radar video. While the contents of the first memory bank are being sent the computer calculates the new positions of the aircraft as they will appear on the second scan and stores them as a serial bit train in the second memory bank.

When the Azimuth Reference Pulse at the end of the first simulated radar scan is detected the memory banks again switch functions so that the hardware can start sending the contents of the second memory bank to the receiving equipment. The program directs the computer to simultaneously calculate the positions of the aircraft for the next scan and store this data in the first memory bank. This switching of memory banks is continued as the simulation proceeds. The number of sweeps per scan and the range of the simulated radar determine the memory requirements. It has been found that approximately two megabytes of memory for each memory bank is sufficient for most purposes.

All hardware such as the two memory banks, etc. is on a printed circuit board (the PROBE board) which can be installed in a conventional personal computer having an 80386 CPU or better.

OBJECTS OF THE PRESENT INVENTION

Accordingly, it is an object of the present invention to provide a means of simulating radar video using a personal computer.

It is a further object of the present invention to provide such a means having minimum memory requirements.

It is a further object of the present invention to provide such a means requiring minimum processing capabilities.

It is a still further object of the present invention to provide a means for displaying repetitive series of data which change between series which requires, minimum processing capabilities.

It is a still further object of the present invention to provide such a means having minimum memory requirements.

Other objects and advantages of the present invention will be apparent from the following specification and drawings.

BRIEF DESCRIPTION OF THE DRAWINGS

FIG. 3 is a typical configuration file for the radar set to be emulated by the system of the present invention.

FIG. 4 is a typical scenario file for the aircraft to be simulated by the system of the present invention.

FIG. 5 is a flow chart of the software that sorts and stores the aircraft input scenarios.

FIG. 6 is a flow chart of the software that is used to traverse the aircraft list.

DESCRIPTION OF THE PREFERRED EMBODIMENT a. HARDWARE

Figure 1:
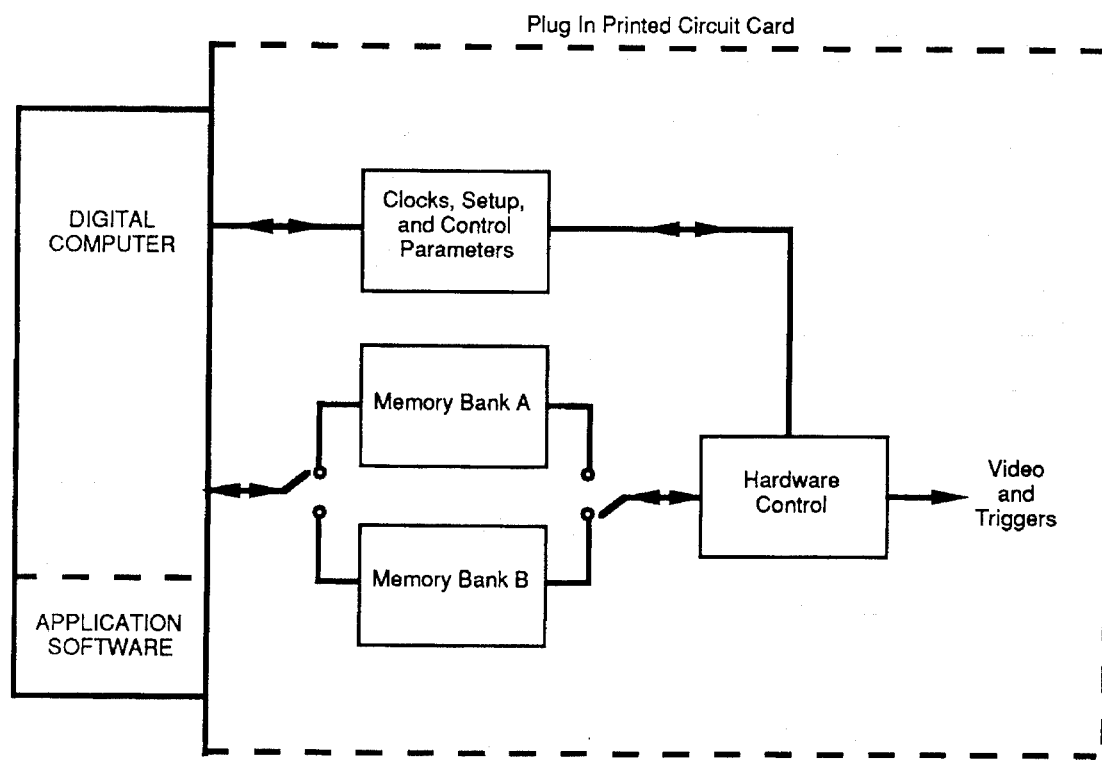
FIG. 1 is a simplified system functional overview of the present invention.
Figure 2:
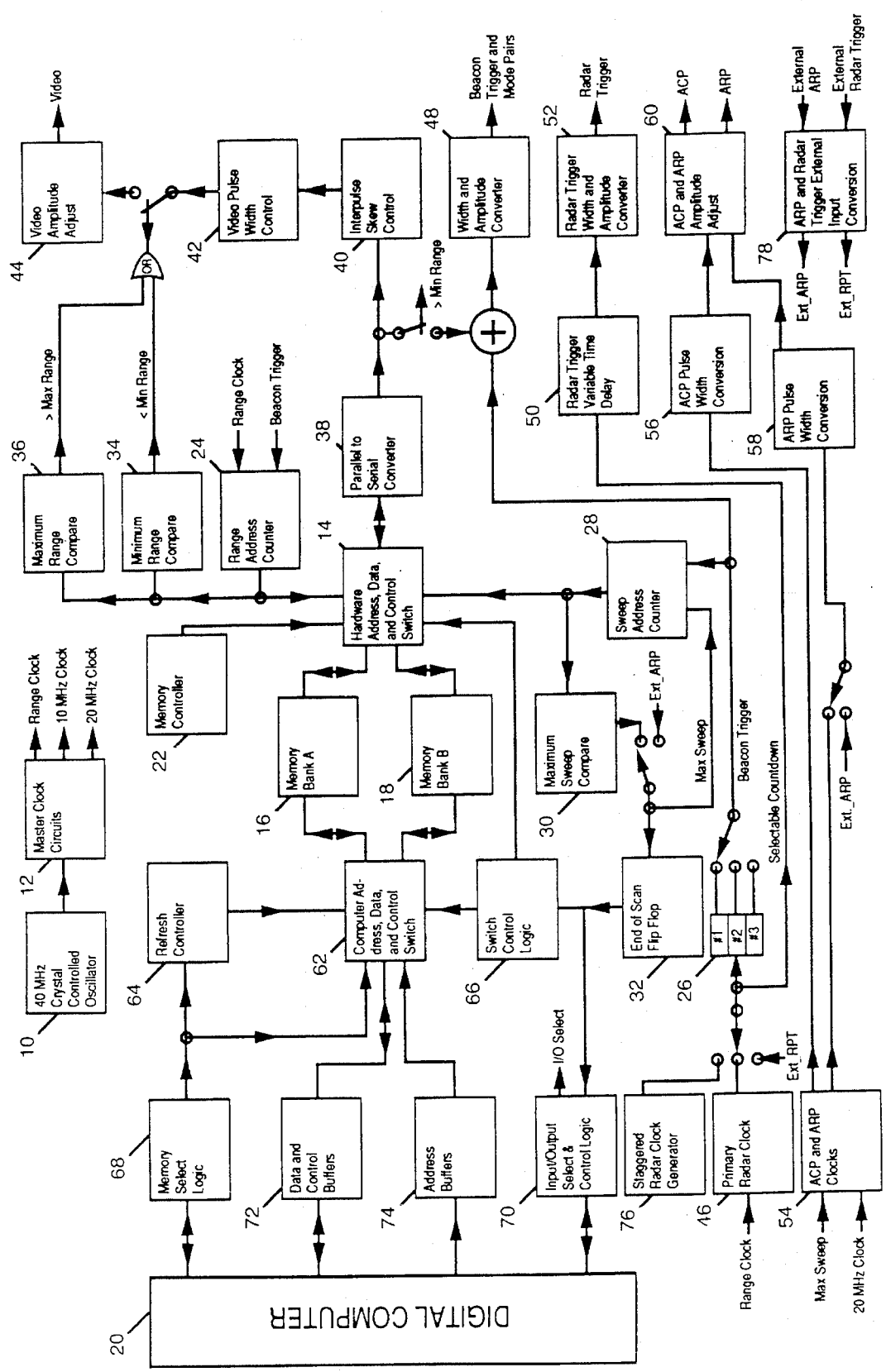
FIG. 2 is a functional diagram of the hardware of the present invention.

System timing is controlled by 40 MHz crystal controlled oscillator 10 whose output is divided by twenty nine to produce a square wave with a period of 0.725 microseconds. This is called the range clock and it along with 10 MHz and 20 MHz clocks are generated by master clock circuits 12. These clocks are used by the remaining circuitry to control the system.

Hardware address, data, and control switch 14 is used to select the signals from memory bank A 16 or memory bank B 18. The selected bank will be used to output radar data which was stored in it by digital computer 20. Memory controller 22 repeats a cycle on each memory address where it reads the memory, then fills it with zeroes, and then executes a refresh cycle. Writing zeroes into the memory at this time saves a significant amount of time over writing them in later when under software control. The addressing for the memory is generated by two different counters. Range address counter 24 is used to produce addresses during the sweep; these are the lower address bits of the address range. Range address counter 24 is clocked with the range clock and reset at the beginning of each sweep with the beacon trigger signal generated by selectable countdown 26. Sweep address counter 28 is used to select individual sweeps and is clocked by the beacon trigger signal. When maximum sweep compare circuitry 30 detects a maximum count, the max sweep signal is generated. The max sweep signal is used to reset sweep address counter 28 and to toggle end of scan flip flop 32. The ARP is also generated at this time. Minimum range compare circuit 34 and maximum range compare circuit 36 are used to control the time period in which the serial video data bits are allowed to be transmitted. They also control the mode pair pulses's output time slots. Each address which is read by memory controller 22 is latched into parallel to serial converter 38 where a serial bit stream is generated. The time difference between consecutive pulses is controlled by inter-pulse skew control circuit 40. Next the pulse width is set by video pulse width control circuit 42. Finally, video amplitude adjust circuit 44 controls the amplitude of the radar video output.

Primary radar clock 46 produces the primary radar trigger pulses. The primary radar trigger pulses are used by selectable countdown 26 to produce the beacon trigger signal. The beacon trigger signal is combined with the mode pair pulses and an output signal is produced by beacon trigger and mode pair width and amplitude converter 48. The primary radar trigger signal is delayed in time by radar trigger variable time delay 50 and output through radar trigger width and amplitude converter 52. The ACP and ARP clocks 54 are produced from the 20 MHz system clock and the max sweep signal. The pulse widths of the ACP and ARP signals are controlled by ACP pulse width converter 56 and ARP pulse width converter 58, respectively. A single circuit, the ACP and ARP amplitude adjust circuit 60, is used to control both output amplitudes.

Digital computer 20 is used to write data into the appropriate memory bank via computer address, data, and control switch 62. Refresh controller 64 provides memory refresh signals to the selected memory bank. Switch control logic 66 has two modes of operation, static and automatic, which are selected by digital computer 20. When the automatic mode is set switch control logic 66 will interchange memory banks every time end of scan flip flop 32 changes state. In the static mode of operation either memory bank can be selected to be interfaced to digital computer 20. The static mode is useful for the generation of map video or can be used when the aircraft positions are not changing. Memory select logic 68 provides memory address decoding signals to select the proper memory address of the active memory bank. Input/output select and control logic 70 provides a means for digital computer 20 to control all aspects of system operation by using parallel programmed input/output control words to set control latches. Data and control buffers 72 and address buffers 74 provide an interface between the normal bus signals from digital computer 20 and the emulator's input/output and memory hardware.

A means to generate a series of multi-periodic radar and beacon triggers is also provided. This is referred to as a staggered radar system and is simulated by the staggered radar clock generator 76. The stagger periods are programmable and provide a fixed set of different radar trigger periods which repeat in a cycle. This function was provided because certain types of radars use this technique.

A means to synchronize the emulator to an external radar system by use of the ARP and radar trigger signals from an external system is also provided. The ARP and radar trigger external input conversion circuits 78 detect and shape the externally generated ARP and radar trigger pulses. The signals are then used to synchronize the system hardware to the external inputs. This allows adding targets to the external radar system or, by using two emulators, to produce synchronized search and beacon radar emulation. Another option which is made feasible from this synchronization technique is that of producing video maps. With some software modifications, the system could provide an area map in a format which could be used directly by air traffic control automation displays in place of existing map generating equipment.

The above hardware components, which are conventional components well known in the art, are assembled on a printed circuit card which is installed into the computer just like any other add-in card.

b. SOFTWARE

The application software is divided into two sections, an initialization section and an operational section. The initialization section readies the software and hardware to execute the scenarios desired. The operational section executes the scenarios and provides a user status display.

The initialization software begins by requesting the user to select a formatted text file which describes the configuration of the radar system which is to be emulated. FIG. 3 depicts a typical configuration file. Each line of the file is evaluated by the software for the proper syntax and then a reasonability test is performed. If a syntax error or an out of tolerance input is detected the program is halted with a warning message displayed to the user. If this file is parsed successfully the data is used to define various system operational parameters and control options.

FIG. 3 is the default configuration which represents a typical radar configuration. The file itself is an ASCII file and must use the DOS extension .CFG. Comment lines are allowed; they must start at the first character position in the line, have minus signs in the first two positions (—), and should be limited to 80 characters each. Blank lines (i.e. linefeeds only) are permitted and may be used for any line of the file. "Memory base address" is the beginning address for the PROBE board's memory; it is an even number. "I/O port base address" is the beginning address for the PROBE board's hardware input and output ports. "Scan time" is the time for one complete revolution of the simulated radar. It is a real number between 0.1 and 26.0 seconds. "Primary radar PRF" is the number of primary radar interrogations per second. It is a whole number between 18 and 68964 pulses per second. "Beacon radar max range" is the range of the simulated radar. It is between 2.0 and 200.0 nautical miles. "Countdown (radar to beacon)" is the ratio of primary radar interrogations to beacon radar interrogations. It is a whole number between 0 and 3. "Ratio 3A to C", usually called beacon interleave, is the ratio of the number of Mode 3A interrogations to Mode C interrogations. It is either 1 or 2. "Delay primary after beacon" is the time delay of primary radar trigger after beacon radar trigger. It is a real number between 0 and 204.0 microseconds. "Delay P3 after beacon" is the time delay of beacon P3 pulse after beacon trigger. It is a real number in the range of 25.0 to 250.0 microseconds. "Delay TO after beacon" is the time delay of the start of radar video after beacon trigger. It is a real number between 30.0 and 250.0 microseconds. "Video pulse width" is the width of an individual data bit in the video stream. It is a whole number of nanoseconds between 0 and 800 in multiples of 100; the pulse width has a jitter of plus or minus 25 nanoseconds. "Video skew" is the offset in nanoseconds between adjacent video pulses when two reply trains are interleaved. It is a whole number between 50 and 400.

The next file requested, a scenario file, defines all of the aircraft scenarios which will be used during this execution of the software.

FIG. 4 depicts a typical scenario file. Each line of the file is evaluated by the software for the proper syntax and then a reasonability test is performed. If a syntax error or an out of tolerance input is detected the program is halted with a warning message displayed to the user. If this file is parsed successfully the data is used to define the initial parameters for each aircraft. The scenarios are arranged in a list as they are being input from the text file.

Scenario files follow the same general rules as configuration files except that they must have the DOS extension .SCN, each line should contain the definition of only one aircraft, and the maximum number of aircraft definition lines is 10,000. The order of the parameters in a line defines their meaning, and parameters may be separated only by spaces. "TAG" is a numerical tag between 0 and 9999 associated with a particular aircraft. If multiple aircraft definition lines contain identical TAGs and TIMEs, then only the latest occurrence will be used in the simulation. "TIME" is the hours:minutes:seconds from start of simulation to activate an aircraft or change an already active aircraft's parameters; the maximum value allowed is 23:59:59. "BCN" is the simulated reply from a Mode 3/A aircraft transponder; it is four octal digits in the range of 0–7. "RANGE" is the slant range of the target from the radar in nautical miles; it is a real number up to a maximum of 250.0. "AZIMUTH" is the direction to the target measured clockwise from north; it is a real number between 0 and 360. "SPEED" is the speed of the target in nautical miles per hour. "ACCEL" is the rate of change of speed of the target in knots per second; its range is plus or minus 1000.0. "ALT" is the altitude of the target in feet; the range is −1000 through 100,000 entered as a whole number with no decimal point. "CLIMB" is the rate of altitude change in feet per second, with positive being in the up direction. It is a real number in the range of plus or minus 1000. "HDG" is the heading of the target in degrees measured clockwise from north; it is a real number between 0 and 360. "TURN" is the turning rate of the target in degrees per second measured clockwise from north; positive is the clockwise direction; its range is plus or minus 100.0. "REP" is the number of possible transponder replies with a maximum of 999; it is a whole number and will be less than the maximum for non Mode C equipped aircraft. "MC" determines whether the aircraft has a Mode C transponder; it is T for yes or F for no.

An aircraft's trajectory is created by varying the parameters for a given TAG. Using the same TAG value, input a series of lines and change the TIME value at which a given parameter (i.e. altitude, speed, heading, etc.) is to change and also input the new parameter for that time. To leave a parameter unchanged, set its value for that line to an alphanumeric character string beginning with a capital X. More than one parameter can be changed in a single line.

If an active aircraft flies below the minimum or above the maximum altitude, it is removed from the active aircraft list. When an inactive aircraft becomes active again all of its parameters that had alphabetic characters in them (i.e. those parameters that had been defined by the user) will be set to system defaults.

FIG. 5 is a flow chart description of the software process which sorts and stores the input aircraft scenario records. The aircraft records are stored as a singly linked list. Entries are arranged by ascending aircraft tag number. For records where the tag numbers are equal the records are arranged according to ascending start times. The software of FIG. 5 is called each time an aircraft scenario is read from the scenario input file. The pointers to the previous, present, and next records are updated as the list is searched for the proper place to link in the new record. When the new record's tag and time values are evaluated and a proper place is found in the list, the list is amended to include the new record by changing the link pointer values of the list and the new record.

Next a test is made to determine if the parallel input-output port hardware and memory are functioning properly. If a failure is detected the program is halted with a message provided to the user. If the proper responses are received the program continues. Hardware setup parameters are then written via programmed input-output commands. These parameters control the scan time, countdown, interleave, video pulse width, video skew, minimum range, maximum range, and various other system parameters. The memory banks are next both zeroed. One bank at a time is selected using programmed input-output commands and zeroes are written into each memory location. Next the mode pairs are written into each memory bank at the proper addresses so that they may be output later with the proper time delay relative to the beacon trigger. The bit spacing inserted between the mode pair pulses determines which mode a particular sweep represents. The mode pairs need be written only one time and are used throughout the entire simulation. The last functions to be performed are the initialization of the user graphics interface routines and the system clocks.

The operational software executive is a continuous loop which cycles through each routine until an "Alt X" keyboard input is detected, at which time the loop is exited. The loop is executed once per scan.

The first major routine which is executed is the routine that simulates the motion of all aircraft scenarios which are determined to be active during a scan. The aircraft scenario list which was constructed during the initialization phase of the program is used in this portion of the program to hold the information that is used to "fly" each simulated aircraft. FIG. 6 is a flow chart representation of the software which is used to traverse the aircraft list. The aircraft scenario list is a forward singly linked list which contains data structures that define each aircraft. These data structures contain the translational, rotational, and other information about each aircraft. Also included are fields for a unique numerical tag, start time, and a flag which defines if this particular record is active. The aircraft list handler of FIG. 6 starts at the first record (HEAD) and tests for an active record. If the record is active, a further test is made to check for an identically tagged record whose start time value indicates that the new record should start. If the new record should start then the old record is deleted from the list and the new record is made active, the equations of motion are executed and the record is processed by the write replies routine. If the old record is not deleted then the equations of motion are executed on that record and it is processed by the write replies routine. For the case where the present record is not active, the start time is tested and the record is made active if the time is correct. A newly activated record has the equations of motion executed and then it is processed by the write replies routine. This process is repeated as the list is traversed. At each step, tests are made to determine if the pointers are at the head or last record of the list, and special processing is conducted to ensure that the list integrity is not violated by inadvertently losing the head pointer or searching beyond the last record.

The routine which writes the replies into memory is shown in the last part of FIG. 6. This routine first checks to see that an aircraft record is within the physical bounds specified. Any record which is not within bounds is deleted from the list. If the record is within bounds, a test is made to determine if the record is physically visible to the radar. Only records which are visible have their replies written into the memory bank at the proper addresses.

The beacon code, range, azimuth, and altitude of each aircraft are used to store the appropriate bit pattern response into the proper address of the memory bank to which the computer is communicating. A special case exists when an aircraft's radar response straddles the north azimuth. Because targets are computed and stored ahead of their actual video transmission and the fact that the memory bank is read beginning at north azimuth, a discontinuity would result in the return pattern if a special algorithm were not used. By detecting the north straddling aircraft and either computing ahead or using stored replies (depending upon the direction of motion) the anomaly is greatly reduced.

Figure 7:
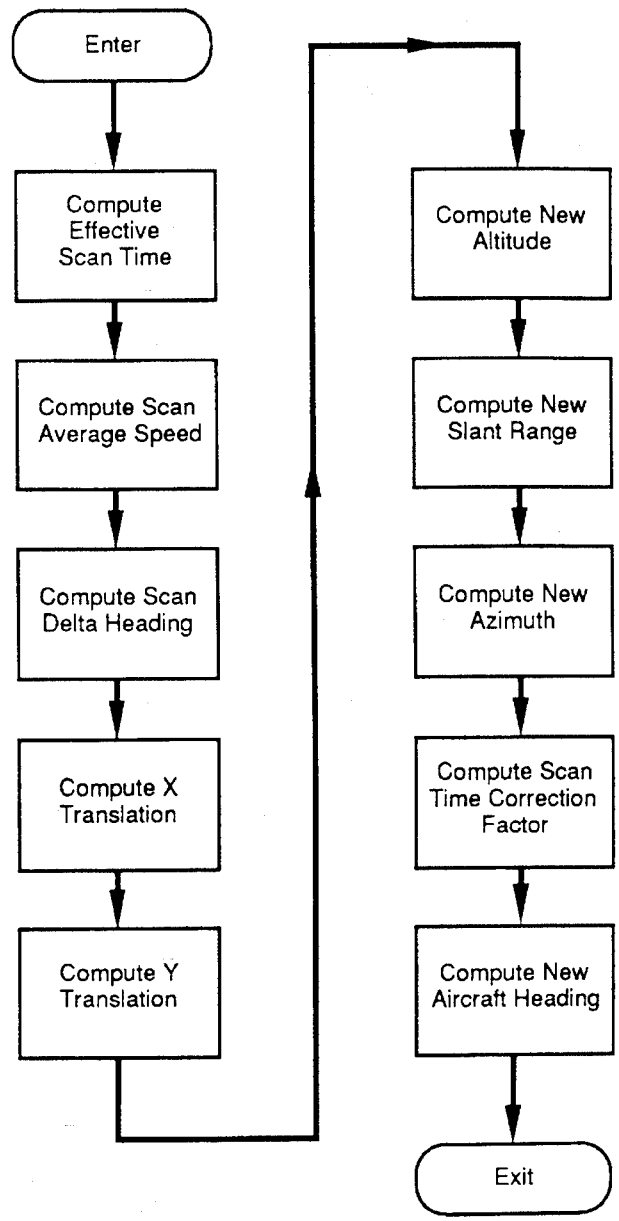
FIG. 7 is a flow chart of the equations of motion routine that calculates the positions of all the aircraft for each scan of the radar.

The equations of motion routine, which is diagrammed in flow chart form in FIG. 7, is executed for each active aircraft record. An effective scan time is used to determine the X,Y, and Z translation positions and new heading of each aircraft. The effective scan time is computed based on the azimuth change that an aircraft experienced over the last scan time cycle. This adjustment is necessary because the aircraft are moving and the radar interrogation time between rotations for the same aircraft will be offset by the amount of azimuthal change that the aircraft experienced during the radar rotation. The linear acceleration, sink rate, and turn rate are used to adjust the translational and rotational calculations. The new values for slant range and azimuth are used by the write replies routine to locate the replies in the memory bank.

The next routine is the graphical user interface, which presents the location of each active aircraft to the user on the video screen of the computer and also presents various parameters dealing with system performance. Aircraft positions are displayed on the computer screen as well as the radar screen in order to aid the user (who may not be in a position to see the radar screen). The final action of the main loop is to wait for the maximum sweep count signal, which indicates that the ARP has occurred and that it is time to begin the cycle over again.

Although the present invention has been described in the context of a simulated radar display, it is obvious that the principle can be applied to any type of computer program having the same overall characteristics; that is, a long and complex set of calculations the results of which are stored for later display, followed by a simultaneous display of these results over a finite amount of time while calculating and storing the next screen display so that one screen display blends seamlessly into the next. It could also be extended to the situation where more than one first screen display is calculated and stored before the stored screen displays Are displayed on a screen while simultaneously calculating and storing the next display.

I claim:

1. Apparatus for simulating radar returns or radar mapping on a desktop computer which comprises first means for calculating radar video corresponding to a first scan of the radar to be simulated, second means for storing said calculated video, third means for simultaneously calculating and storing radar video corresponding to a second scan of said radar while transmitting said video corresponding to said first scan of said radar to said desktop computer's display screen, and fourth means for selectively re-transmitting said radar video corresponding to said first scan of said radar instead of said radar video corresponding to said second scan of said radar.

2. Apparatus as in claim 1 wherein said first means comprises the computer's central processing unit (CPU).

3. Apparatus as in claim 2 wherein said second means comprises the computer's random access memory.

4. Apparatus as in claim 3 wherein said third means comprises the computer's random access memory and the computer's central processing unit (CPU).

5. Apparatus as in claim 4 wherein said fourth means comprises a software-selectable switch.

6. Apparatus as in claim 5 further including fifth means for allowing the user to input the initial parameters for the aircraft to be simulated by said apparatus.

7. Apparatus as in claim 6 further including sixth means for allowing the user to input the course changes of the aircraft to be simulated by said apparatus.

8. The method of simulating radar returns or radar mapping on a desktop computer which comprises calculating a first simulated radar scan, storing said first radar scan, and then either repeatedly transmitting said first radar scan to the computer's display screen or simultaneously transmitting said first radar scan while calculating and storing a second simulated radar scan.

9. The method of claim 8 further including continuously transmitting a previously stored simulated radar scan while calculating and storing the following simulated radar scan when simulating radar returns.

10. The method of claim 9 further including inputting the initial parameters for the aircraft to be simulated.

11. The method of claim 10 further including inputting the course changes of the aircraft to be simulated.

* * * * *